(12) United States Patent
Peace et al.

(10) Patent No.: US 11,339,684 B2
(45) Date of Patent: May 24, 2022

(54) FAIRINGS FOR POWER GENERATION MACHINES

(71) Applicant: ROLLS-ROYCE plc, London (GB)

(72) Inventors: Richard Peace, Derby (GB); Oliver C. Taylor-Tibbott, Lichfield (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 16/197,557

(22) Filed: Nov. 21, 2018

(65) Prior Publication Data

US 2019/0178106 A1 Jun. 13, 2019

(30) Foreign Application Priority Data

Dec. 11, 2017 (GB) .................................... 1720603

(51) Int. Cl.
| | | |
|---|---|---|
| *F01D 25/24* | (2006.01) | |
| *F02C 7/25* | (2006.01) | |
| *H02K 7/18* | (2006.01) | |
| *H02K 5/02* | (2006.01) | |
| *B32B 15/14* | (2006.01) | |

(Continued)

(52) U.S. Cl.
CPC ................ *F01D 25/24* (2013.01); *F02C 7/25* (2013.01); *H02K 5/02* (2013.01); *H02K 7/1823* (2013.01); *B32B 15/14* (2013.01); *B32B 15/20* (2013.01); *B32B 2605/18* (2013.01); *B64D 29/00* (2013.01); *F05D 2240/14* (2013.01); *F05D 2300/121* (2013.01); *F05D 2300/133* (2013.01); *F05D 2300/174* (2013.01); *F05D 2300/603* (2013.01); *F05D 2300/6033* (2013.01); *F16M 1/00* (2013.01)

(58) Field of Classification Search
CPC .... F02C 7/24; F02C 7/25; F01D 25/24; F01D 25/26; B64D 29/00
See application file for complete search history.

(56) References Cited

U.S. PATENT DOCUMENTS

| | | |
|---|---|---|
| 3,542,152 A | 11/1970 | Oxx, Jr. et al. |
| 4,240,250 A | 12/1980 | Harris |

(Continued)

FOREIGN PATENT DOCUMENTS

| | | |
|---|---|---|
| DE | 4340951 A1 | 6/1994 |
| EP | 1845018 | 10/2007 |

(Continued)

OTHER PUBLICATIONS

Great Britain search report dated Jun. 7, 2018, issued in GB Patent Application No. 1720603.8.

(Continued)

*Primary Examiner* — David E Sosnowski
*Assistant Examiner* — Maxime M Adjagbe
(74) *Attorney, Agent, or Firm* — Shumaker & Sieffert, P.A.

(57) ABSTRACT

A fairing for a power generation machine, the fairing comprising: a first layer comprising a metallic material and defining a first surface and a second opposite surface, the first layer being configured to enable the fairing to be coupled to the power generation machine; and a second layer comprising a composite material and defining a first surface and a second opposite surface, the second layer being coupled to the first layer, the second surface of the second layer defining an external surface of the fairing.

12 Claims, 3 Drawing Sheets

(51) Int. Cl.
*B32B 15/20* (2006.01)
*B64D 29/00* (2006.01)
*F16M 1/00* (2006.01)

(56) References Cited

U.S. PATENT DOCUMENTS

| | | | |
|---|---|---|---|
| 4,441,578 A | 4/1984 | Rose | |
| 4,705,454 A * | 11/1987 | Bouiller | F01D 21/045 415/119 |
| 4,735,841 A * | 4/1988 | Sourdet | B32B 3/12 428/116 |
| 4,751,979 A | 6/1988 | Wiseman | |
| 4,858,721 A | 8/1989 | Autie et al. | |
| 5,041,323 A | 8/1991 | Rose et al. | |
| 5,447,411 A * | 9/1995 | Curley | F01D 21/045 156/292 |
| 5,806,796 A | 9/1998 | Healey | |
| 5,923,003 A | 7/1999 | Arcas et al. | |
| 6,123,170 A | 9/2000 | Porte et al. | |
| 6,182,787 B1 | 2/2001 | Kraft et al. | |
| 8,579,225 B2 | 11/2013 | Mardjono et al. | |
| 8,695,720 B2 * | 4/2014 | Mickelsen | F02C 7/25 169/45 |
| 8,757,319 B2 | 6/2014 | Bouteiller et al. | |
| 9,592,918 B2 | 3/2017 | Yu et al. | |
| 2012/0102912 A1 * | 5/2012 | Izadi | F01D 21/045 60/39.091 |
| 2013/0223973 A1 | 8/2013 | Ali | |
| 2013/0223977 A1 | 8/2013 | Ali | |
| 2014/0325823 A1 * | 11/2014 | Ferrer | F04D 29/522 29/505 |
| 2015/0136875 A1 | 5/2015 | Lacko | |
| 2015/0285144 A1 | 10/2015 | Todorovic et al. | |
| 2016/0024963 A1 | 1/2016 | Lumbab et al. | |
| 2016/0215700 A1 | 7/2016 | Yu et al. | |
| 2016/0327061 A1 | 11/2016 | Mandel et al. | |
| 2017/0328281 A1 | 11/2017 | Pretty et al. | |
| 2018/0029719 A1 | 2/2018 | Follet et al. | |
| 2018/0363558 A1 | 12/2018 | Weaver et al. | |
| 2019/0259364 A1 | 8/2019 | Peace et al. | |
| 2022/0042455 A1 | 2/2022 | Guillois et al. | |

FOREIGN PATENT DOCUMENTS

| | | |
|---|---|---|
| EP | 2026325 A2 | 2/2009 |
| EP | 2292514 | 3/2011 |
| FR | 2727725 A1 | 6/1996 |
| GB | 2029881 A | 3/1980 |
| GB | 2547049 | 8/2017 |
| WO | 2012076876 A1 | 6/2012 |

OTHER PUBLICATIONS

Great Britain search report dated Aug. 6, 2018, issued in GB Patent Application No. 1802768.0.
Extended European Search Report from counterpart EP Application No. 18205584.8 dated May 9, 2019, 7 pgs.
Response to Extended European Search Report from counterpart EP Application No. 18205584.8 dated May 9, 2019, filed Dec. 12, 2019, 30 pgs.
Office Action from U.S. Appl. No. 16/266,411, dated Feb. 18, 2022, 13 pp.

* cited by examiner

FAIRINGS FOR POWER GENERATION MACHINES

CROSS-REFERENCE TO RELATED APPLICATIONS

This specification is based upon and claims the benefit of priority from UK Patent Application Number 1720603.8 filed on 11 Dec. 2017, the entire contents of which are incorporated herein by reference.

BACKGROUND

Technical Field

The present disclosure concerns fairings for power generation machines.

Description of the Related Art

Power generation machines (such as gas turbine engines, reciprocating engines, and electrical machines) may be mounted on a vehicle to provide propulsion and/or to generate electrical power. A fairing may be provided around the power generation machine to reduce the drag caused by the power generation machine when the vehicle is in motion.

SUMMARY

According to a first aspect there is provided a fairing for a power generation machine, the fairing comprising: a first layer comprising a metallic material and defining a first surface and a second opposite surface, the first layer being configured to enable the fairing to be coupled to the power generation machine; and a second layer comprising a composite material and defining a first surface and a second opposite surface, the second layer being coupled to the first layer, the second surface of the second layer defining an external surface of the fairing.

The first layer may be configured to couple to the power generation machine via one or more fasteners.

The first surface of the first layer may comprise a portion that is shaped to match a surface of the power generation machine. The portion may be for adhering to the power generation machine.

The first layer may be configured to enable the fairing to comply with ISO2685:1998.

The second layer may have no protrusions extending from the second surface to minimize excrescence drag.

The first surface of the first layer may have a concave shape. The second surface of the second layer may have a convex shape.

The metallic material of the first layer may comprise aluminium or titanium or steel.

The composite material of the second layer may comprise a carbon composite or an oxide ceramic matrix composite.

According to a second aspect there is provided a fairing for a power generation machine, the fairing comprising: a first layer comprising a metallic material and defining a first surface and a second opposite surface, the first surface of the first layer having a concave shape; and a second layer comprising a composite material and defining a first surface and a second opposite surface, the second layer being coupled to the first layer, the second surface of the second layer defining an external surface of the fairing and having a convex shape.

According to a third aspect there is provided a fairing for a power generation machine, the fairing comprising: a first layer comprising a metallic material and defining a first surface and a second opposite surface, the first layer being configured to enable the fairing to comply with ISO2685:1998; and a second layer comprising a composite material and defining a first surface and a second opposite surface, the second layer being coupled to the first layer, the second surface of the second layer defining an external surface of the fairing.

According to a fourth aspect there is provided apparatus comprising a power generation machine and a fairing as described in the preceding paragraphs. The first layer of the fairing may be coupled to the power generation machine.

The power generation machine may be a gas turbine engine.

The power generation machine may be an electrical machine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
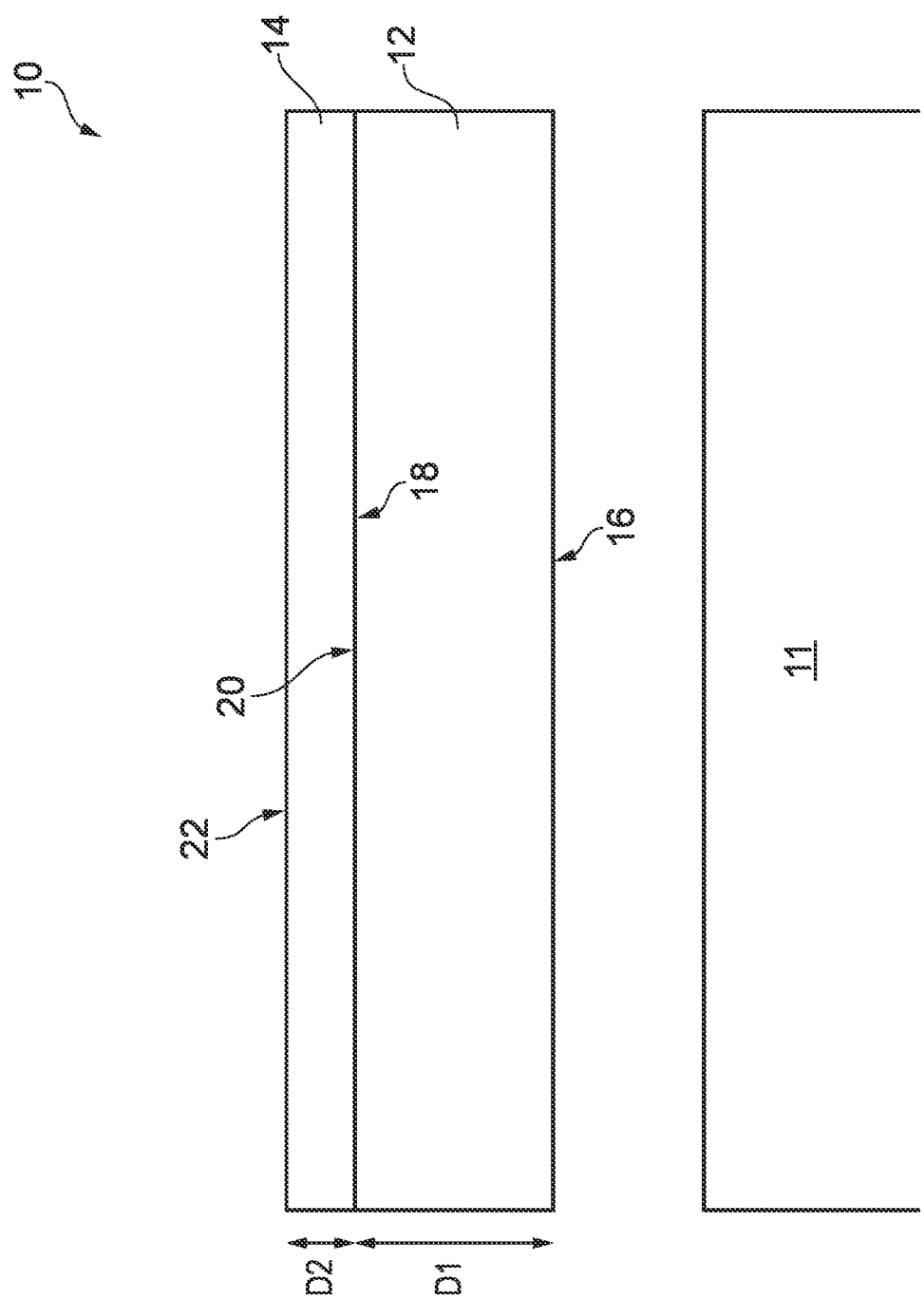
FIG. 1 illustrates a schematic side view diagram of a fairing according to a first example.

FIG. 1 illustrates a schematic side view diagram of a fairing 10 for a power generation machine 11. The power generation machine 11 may be any suitable machine for generating mechanical power and/or electrical power. For example, the power generation machine 11 may be a gas turbine engine, a reciprocating engine, or an electrical machine such as an electrical motor or an electrical generator.

Figure 2:
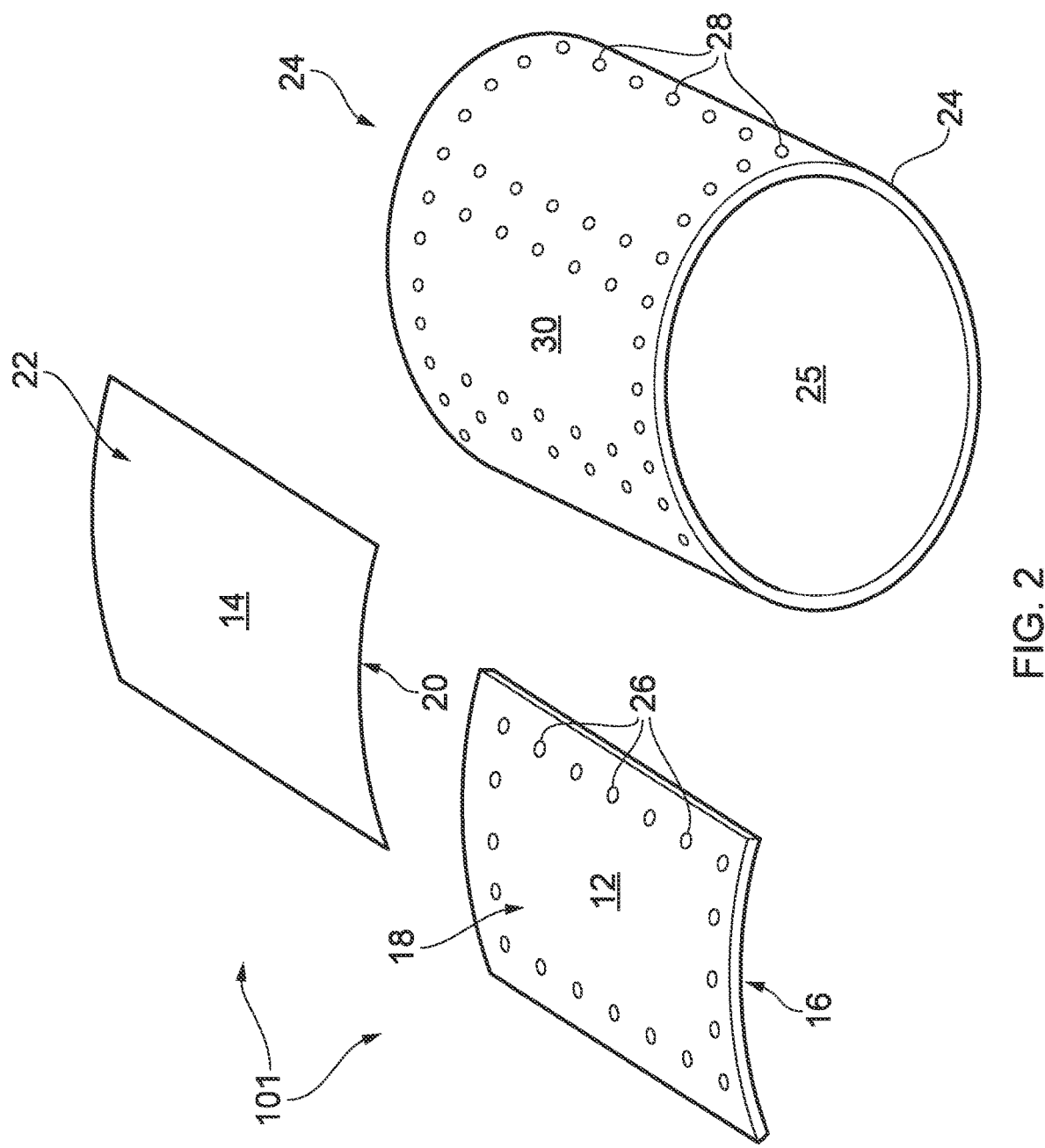
FIG. 2 illustrates a perspective exploded view of a fairing according to a second example, and a casing of a power generation machine.

The fairing 10 (which may also be referred to as a cowling in some examples) includes a first layer 12 and a second layer 14. The first layer 12 comprises a metallic material and may comprise, for example, an aluminium or titanium base alloy, or steel. The first layer 12 defines a first surface 16 and a second opposite surface 18 and may have any suitable shape. For example, the first layer 12 may be planar, curved, or have a complex three dimensional shape. In examples where the fairing 10 is for a cylindrical component of a power generation machine (such as a core casing or a bypass duct vane of a gas turbine engine), the cross sectional shape of the fairing 10 may be an arc of a circle or an ellipse (as illustrated in FIG. 2).

The first layer 12 is configured to enable the fairing 10 to be coupled to the power generation machine 11. For example, the first layer 12 may be configured to couple to the power generation machine 11 via one or more fasteners. In some examples, the first layer 12 may define one or more apertures for receiving one or more fasteners (such as rivets or nuts and bolts) to enable the first layer 12 to be fastened to the power generation machine 11. In other examples, the first layer 12 may comprise one or more spring pins that extend from the first surface 16 and may be inserted into holes within the power generation machine 11 to couple the first layer 12 to the power generation machine 11.

In some examples, the first surface 16 of the first layer 12 may comprise a portion that is shaped to match, and is for adhering to, a surface of the power generation machine 11. For example, where a component of the power generation machine 11 has a cylindrical shape, a portion of the first surface 16 may define an arc of a circle to match the shape of the component and to enable the portion to be adhered to the component.

It should be appreciated that the first layer 12 may be configured to couple to the power generation machine 11 using two or more of the examples mentioned in the preceding paragraphs. For example, the first layer 12 may comprise a plurality of apertures for receiving fasteners, and one or more spring pins for inserting into one or more holes in the power generation machine 11. By way of another example, the first layer 12 may comprise one or more spring pins for inserting into one or more holes in the power generation machine 11, and may also comprise a portion that is shaped to match and be adhered to a surface of the power generation machine 11.

The first layer 12 may be fire resistant and may enable the fairing 10 to comply with International Standard ISO2685:1998 (Aircraft—Environmental test procedure for airborne equipment—resistance to fire in designated fire zones) and thereby provide fire containment for the power generation machine 11. In particular, the metallic material of the first layer 12, the depth (D1) of the first layer 12 and the shape of the first layer 12 may be selected so that the fairing 10 meets, or exceeds, the requirements set out in ISO2685:1998 and FAA AC20-135. For example, the first layer 12 may have a depth of at least 0.038 centimeters and comprise stainless steel. By way of another example, the first layer 12 may have a depth of at least 0.046 centimeters and comprise mild steel protected against corrosion. By way of a further example, the first layer 12 may have a depth of at least 0.041 centimeters and comprise titanium. By way of another example, the first layer 12 may have a depth of at least 0.046 centimeters and comprise Monel.

The second layer 14 comprises a composite material and may comprise, for example, carbon fibre composite or an oxide ceramic matrix composite. The second layer 14 defines a first surface 20 and a second opposite surface 22, and has a depth D2. The depth D2 of the second layer 14 may be less than the depth D1 of the first layer 12. In some examples, the shape and dimensions of the second layer 14 may be the same as the shape and dimensions of the first layer 12. In other examples, the shape and dimensions of the second layer 14 may be different to the first layer 12. For example, the second layer 14 may be larger than the first layer 12 and may at least partially cover an adjacent first layer of another fairing according to the disclosure.

The second layer 14 is coupled to the first layer 12. For example, the second layer 14 and the first layer 12 may be coupled via one or more fasteners (such as one or more springs pins, and/or one or more sunken rivets) or via an adhesive.

The second surface 22 of the second layer 14 defines an external surface of the fairing 10. In other words, the second surface 22 of the second layer 14 interfaces with the air surrounding the fairing 10 when the fairing 10 is coupled to the power generation machine 11. The second surface 22 may have no protrusions (such as rivets) extending from the second surface 22 to minimize or eliminate excrescence drag. Consequently, in some examples the second surface 22 may be aerodynamically flush and may produce zero excrescence drag.

The fairing 10 may provide several advantages. First, the fairing 10 may provide effective fire containment for the power generation machine 11. In particular, the materials and arrangement of the first layer 12 may enable the fairing 10 to meet, or exceed, ISO2685:1998.

Second, the second surface 22 of the second layer 14 may have few or no protrusions and may thus provide an optimal aerodynamic surface for the fairing 10. Where the power generation machine 11 provides a propulsor for a vehicle, the fairing 10 may thus improve the performance of the vehicle by reducing drag on the vehicle.

Third, the first layer 12 may be manufactured with higher engineering tolerances because the first layer 12 may not provide an external surface of the fairing 10 which affects the aerodynamic performance of the fairing 10. This may simplify the manufacturing process for the fairing 10 and may thus reduce the cost of the fairing 10 relative to other fairings.

Fourth, the structure and materials of the fairing 10 may result in the fairing 10 having a relatively low mass. Where the power generation machine 11 and the fairing 10 are mounted on a vehicle, this may advantageously reduce the weight of the vehicle and thus reduce the energy consumption of the power generation machine 11.

FIG. 2 illustrates a perspective exploded view of a fairing 101 according to a second example, and a casing 24 of a power generation machine. The fairing 101 is similar to the fairing 10 and where the features are similar, the same reference numerals are used. The casing 24 has a cylindrical shape and defines a cavity 25 for receiving other components of the power generation machine therein.

The cross sectional shape of the first layer 12 is an arc of a circle and consequently, the first surface 16 has a concave shape and the second surface 18 has a convex shape. The cross sectional shape of the second layer 14 is also an arc of a circle and consequently, the first surface 20 has a concave shape and the second surface 22 has a convex shape.

The first layer 12 defines a plurality of apertures 26 and the casing 24 also defines a plurality of apertures 28. The first layer 12 may be coupled to the casing 24 by inserting a plurality of fasteners (such as rivets) through the apertures 26 and the apertures 28. Once coupled, the first surface 16 of the first layer 12 may abut or be in close proximity to an exterior surface 30 of the casing 24. The second layer 14 may then be coupled to the first layer 12 via one or more fasteners or via an adhesive.

The shape of the first surface 16 is manufactured so that at least a portion of the first surface 16 matches the shape of the exterior surface of the casing 24. Consequently, the first layer 12 of the fairing 101 may additionally or alternatively be coupled to the casing 24 via adhesive.

It should be appreciated that a single fairing 101 is illustrated in FIG. 2 to maintain the clarity of the figures and that a plurality of the fairings 101 may be used to completely cover the exterior surface of the casing 24.

Figure 3:
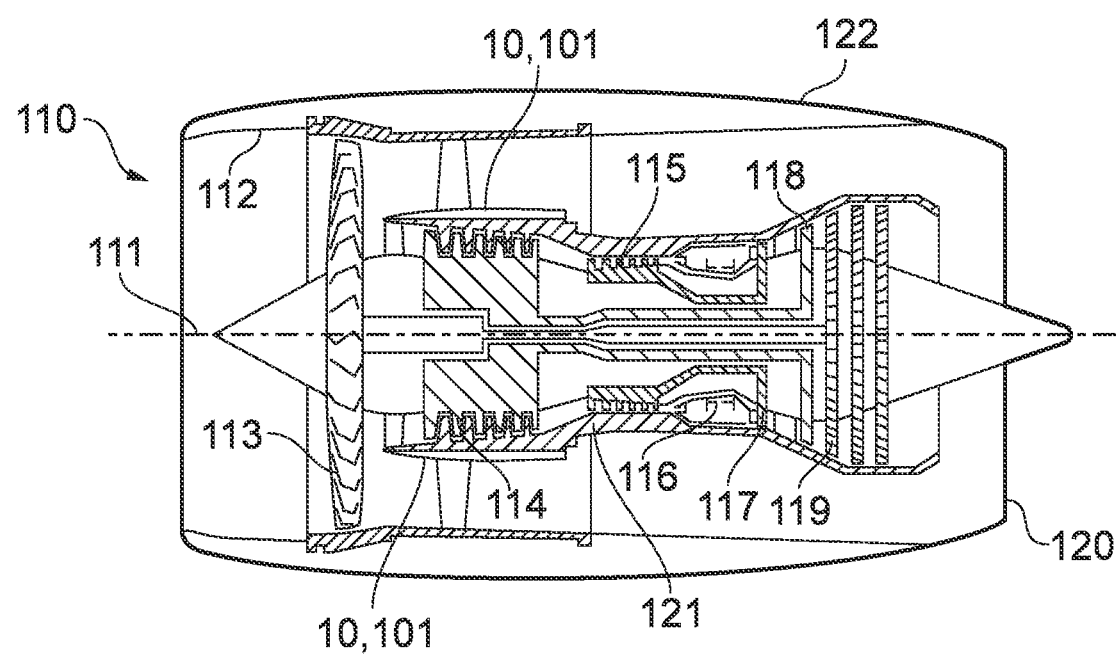
FIG. 3 illustrates a cross sectional side view of a gas turbine engine according to an example.

FIG. 3 illustrates a cross sectional side view of a gas turbine engine 110 according to the disclosure.

The gas turbine engine 110 has a principal and rotational axis 11 and comprises, in axial flow series, an air intake 112, a propulsive fan 113, an intermediate pressure compressor 114, a high-pressure compressor 115, combustion equipment 116, a high-pressure turbine 117, an intermediate pressure turbine 118, a low-pressure turbine 119, and an exhaust nozzle 120.

A core casing 121 surrounds the propulsive fan 113, the intermediate pressure compressor 114, the high-pressure compressor 115, the combustion equipment 116, the high-pressure turbine 117, the intermediate pressure turbine 118, and the low-pressure turbine 119. A nacelle 122 generally surrounds the gas turbine engine 110 and defines both the intake 112 and the exhaust nozzle 120.

In operation, air entering the intake 112 is accelerated by the fan 113 to produce two air flows: a first air flow into the intermediate pressure compressor 114 and a second air flow which passes through a bypass duct to provide propulsive thrust. The intermediate pressure compressor 114 compresses the air flow directed into it before delivering that air to the high pressure compressor 115 where further compression takes place.

The compressed air exhausted from the high-pressure compressor 115 is directed into the combustion equipment 116 where it is mixed with fuel and the mixture combusted. The resultant hot combustion products then expand through, and thereby drive the high pressure turbine 117, the intermediate pressure turbine 118 and the low pressure turbine 119 before being exhausted through the nozzle 120 to provide additional propulsive thrust. The high pressure turbine 117, the intermediate pressure turbine 118 and the low pressure turbine 119 drive respectively the high pressure compressor 115, the intermediate pressure compressor 114 and the fan 113, each by suitable interconnecting shaft.

One or more fairings 10, 101 are coupled to the core casing 121 and axially overlap the intermediate pressure compressor 114. In other examples, one or more fairings 10, 101 may additionally or alternatively be coupled to the core casing 121 at another location on the core casing 121. For example, one or more fairings 10, 101 may be coupled to the core casing 121 and axially overlap one or more of the high pressure compressor 115, the combustion equipment 116, the high pressure turbine 117, the intermediate pressure turbine 118 and the low pressure turbine 119. The one or more fairings 10, 101 may be advantageous in that they may cause less drag on air flowing through the bypass duct and may thus improve the performance of the gas turbine engine 110.

Other gas turbine engines to which the present disclosure may be applied may have alternative configurations. By way of an example, such engines may have an alternative number of interconnecting shafts (two for example) and/or an alternative number of compressors and/or turbines. Furthermore, the gas turbine engine 110 may comprise a gearbox provided in the drive train from a turbine to a compressor and/or fan.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine comprising:
a core casing; and
a fairing comprising:
a first layer comprising a metallic material and defining a first surface and a second opposite surface, wherein the first surface of the first layer comprises a portion that is shaped to match a surface of the core casing, and is adhered to the core casing, and wherein the metallic material of the first layer comprises aluminium or titanium; and
a second layer comprising a composite material comprising a carbon composite or an oxide ceramic composite and defining a first surface and a second opposite surface, the first surface of the second layer being coupled to the second opposite surface of the first layer, the second surface of the second layer defining an external surface of the fairing, and wherein the first layer is between the core casing and the second layer.

2. The gas turbine engine as claimed in claim 1, wherein the first layer is further configured to couple to the core casing via one or more fasteners.

3. The gas turbine engine as claimed in claim 1, wherein the first layer is configured to enable the fairing to comply with ISO2685:1998.

4. The gas turbine engine as claimed in claim 1, wherein the second layer has no protrusions extending from the second surface to minimize excrescence drag.

5. The gas turbine engine as claimed in claim 1, wherein the first surface of the first layer has a concave shape, and the second surface of the second layer has a convex shape.

6. The gas turbine engine as claimed in claim 1, wherein the first surface of the first layer faces the core casing.

7. An apparatus comprising:
a power generation machine comprising a core casing; and
a fairing comprising
a first layer comprising a metallic material and defining a first surface and a second opposite surface, wherein the first surface of the first layer comprises a portion that is shaped to match a surface of the power generation machine, and is configured to be adhered to the core casing, and wherein the metallic material of the first layer comprises aluminium or titanium; and
a second layer comprising a composite material comprising a carbon composite or an oxide ceramic composite and defining a first surface and a second opposite surface, the second layer being coupled to the first layer, the second surface of the second layer defining an external surface of the fairing, and wherein the first layer is between the core casing and the second layer.

8. The apparatus as claimed in claim 7, wherein the power generation machine is a gas turbine engine.

9. The apparatus as claimed in claim 7, wherein the power generation machine is an electrical machine.

10. The apparatus as claimed in claim 7, wherein the first surface of the first layer faces the core casing.

11. A gas turbine engine comprising:
a core casing; and
a fairing comprising:
a first layer comprising a metallic material and defining a first surface and a second opposite surface, the first surface of the first layer having a concave shape, wherein the first surface of the first layer comprises a portion that is shaped to match a surface of the core casing, the portion configured to be adhered to the core casing, and wherein the metallic material of the first layer comprises aluminium or titanium; and a second layer comprising a composite material comprising a carbon composite or an oxide ceramic composite and defining a first surface and a second opposite surface, the second layer being coupled to the first layer, the second surface of the second layer defining an external surface of the fairing and having a convex shape, and wherein the first layer is between the core casing and the second layer.

12. The gas turbine engine as claimed in claim 11, wherein the first surface of the first layer faces the core casing.

* * * * *